Patented Aug. 14, 1923.

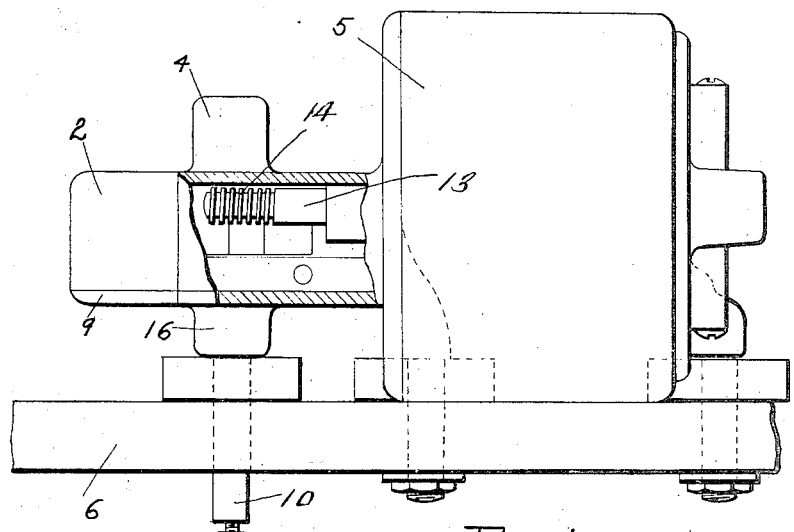
Fig-1-
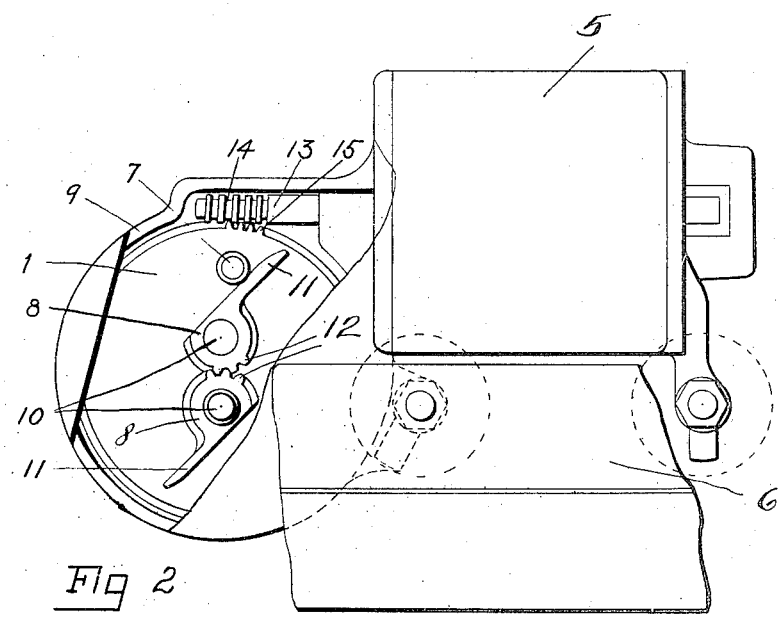
Fig 2

1,464,856

UNITED STATES PATENT OFFICE.

SERGIUS VERNET, OF SYRACUSE, NEW YORK.

MECHANICAL MOVEMENT.

Application filed May 3, 1922. Serial No. 558,057.

*To all whom it may concern:*

Be it known that I, SERGIUS VERNET, a citizen of the United States, residing at Syracuse, in the county of Onondaga and State of New York, have invented a certain new and useful Mechanical Movement, of which the following is a specification.

This invention has for its object a mechanical movement for transferring a rotary movement into an oscillating movement, which is particularly simple in construction, and highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 1 is a plan view of one embodiment of this mechanical movement, the same being shown as mounted upon a windshield and employed to actuate a windshield wiper.

Figure 2 is an elevation, partly broken away, of parts seen in Fig. 1.

Figure 3:
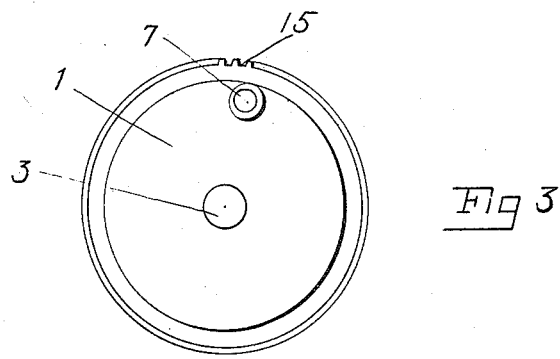
Figure 3 is a face view of the driving element.
Figure 4:
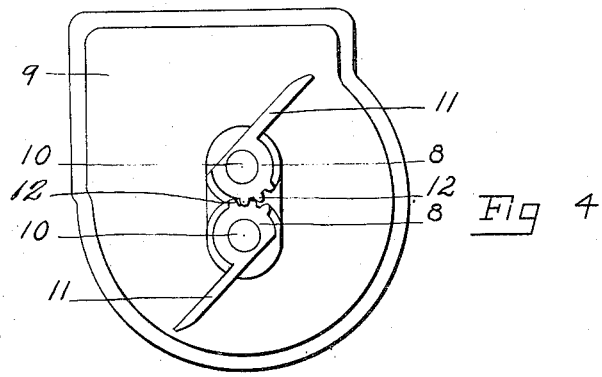
Figure 4 is an inner face view of the support for the driven elements, and parts carried thereby.
Figure 5:
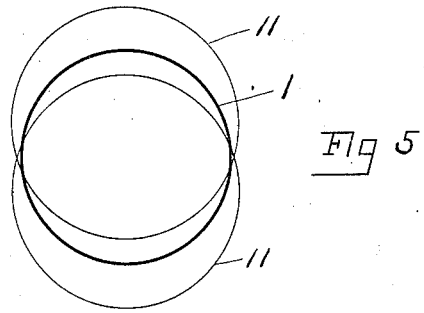
Figure 5 is a diagrammatic view showing the orbits of the driving and driven elements.

This mechanical movement comprises generally a rotating driving element and an oscillating driven element mounted to rock about an axis eccentric to the axis of the driving element, the driving element having a cam movable in an orbit and the driven element having a follower having a portion which moves in an orbit, which portion the cam engages, the orbit of the cam lapping one side of the orbit of the follower, whereby the cam engages the follower in the lapping portions of the orbits and moves the driven element in one direction until the cam moves out of the lapping portions of the orbits, and means for moving the driven element in the opposite direction when the cam moves out of engagement with the follower.

In the illustrated embodiment of my invention, two driven elements are employed, arranged to be engaged alternately by the cam of the driving element and each of these driven elements constitutes means for moving the other in the opposite direction to that in which it is moved by the cam.

I have here shown my mechanical movement as embodied in a device for operating windshield wipers or cleaners of motor vehicles and 1 designates the driving element which is mounted in the suitable support or casing 2, it being here shown as a wheel mounted upon a shaft 3 journaled in the hub 4 of the casing 2, the casing 2 is shown as mounted upon the casing 5 of a motor, as an electric motor having suitable electrical connections. The casing 5 is in turn secured in any suitable manner to the top rail 6, or any other, of the wind-shield of a motor vehicle.

The wheel is provided with a cam which is here illustrated as an eccentric pin 7 having a suitable antifriction roller thereon.

8 are the driven elements which are in the illustrated construction carried on the inner face of a sub-support or cover plate 9 for the casing 2, these driven elements 8 being mounted upon pins or shafts 10 carried by the sub-support or cover 9 on opposite sides of the axis or shaft 3 of the driving wheel 1 and within the orbit of the pin 7 and comprising radially extending arms 11 having their outer ends movable in orbits which lap the orbit of the pin 7 on opposite sides of the shaft 3. The driven elements are connected together so that the movement of one is transferred and reversed to the other, and preferably, the hubs of the driven members 8 are formed with intermeshing gear teeth 12. The motor within the casing 5 includes a suitable shaft 13 having a worm 14 thereon meshing with worm gear teeth 15 on the periphery of the wheel 1.

One of the shafts 10 of the driven elements 8 extends through the hub 16 of the cover plate 9 and through the top rail 6 of the windshield to the inner side thereof and the shank of a suitable wiper is mounted on the inner end of the shaft.

In operation, as the wheel 1 turns to the right, Figure 2, the pin 7 engages one of the arms 11 and rocks it on its axis. Owing to the arrangement of the orbits of the pin 7 and the outer ends of the arm 11 of the driven members 8, this pin passes out of the lapping portions of the orbits and hence out of engagement with such arm of the driven element and then moves into engagement with the arm 11 of the other driven element 8 and actuates it.

The movement of the arm 11 coacting with the eccentric pin 7 is transferred and reversed to the other driven element 8 through the gear teeth 12. Hence, while one driven element 8 is being rocked by the eccentric pin 7 of the driving element, the motion thereof is being transferred to the other driven element so that the latter is returned to its starting position to receive the pin 7 as soon as it leaves the former driven element. The shaft to which the wiper is connected is, therefore, rocked back and forth as long as the motor is in a closed circuit.

This mechanical movement is particularly advantageous in that it consists of a few compactly arranged parts.

What I claim is:

1. In a mechanical movement, a rotating driving element having an eccentric pin, an oscillating driven element mounted to rock about an axis eccentric to the axis of the driving element and located within the orbit of said pin, the driven element having a radial follower arm, the end portion of which moves in an orbit lapping one side of the orbit of said pin whereby the pin engages said arm and moves it in one direction until the pin moves out of engagement with said arm, and means for moving the driven element in the opposite direction when the pin moves out of the lapping portions of said orbits and out of engagement with said arm, substantially as and for the purpose described.

2. In a mechanical movement, a rotating driving element, an oscillating driven element mounted to rock on the axis eccentric to an axis of the driving element, the driving element having a cam and the driven element having a follower with which the cam engages, the orbit of the cam lapping one side of the orbit of the follower and the axis of the follower being located within the orbit of the cam, whereby the cam engages the follower in the lapping portions of the orbits and moves the driven element in one direction, and means for moving the driven element in the opposite direction when the cam moves out of engagement with the follower, substantially as and for the purpose specified.

3. In a mechanical movement, a rotating driving element and oscillating driven elements arranged to rock about axes eccentric to the axis of the driving element on opposite sides thereof, said driven elements being connected together, whereby the movement of one is transferred to the other in a reverse direction, the driving element having a cam and the driven elements having followers movable in different orbits with which the cam alternately engages, the orbit of the cam lapping portions of the orbits of said followers on opposite sides of the axis of the driving element and the axes of the followers being located within the orbit of the cam, substantially as and for the purpose set forth.

4. In a mechanical movement, a rotating driving element having an eccentric pin, and oscillating driven elements mounted to rock about axes eccentric to the axis of the driving element on opposite sides thereof and having radial arms, the ends of which move in orbits lapping the orbit of said pin, the axes of the driven elements being located within the orbit of the eccentric pin, and means for transferring and reversing the movement of each driven element to the other, substantially as and for the purpose described.

5. In a mechanical movement, the combination of a rotating driving element having an eccentric pin, and oscillating driven elements mounted to rock about axes eccentric to the axis of the driving element on opposite sides thereof, each driven element having a radial arm, the end portion of which moves in an orbit lapping one side of the orbit of said pin, each arm having a hub formed with gear teeth meshing with the teeth of the other hub, substantially as and for the purpose specified.

6. The combination of a support, a rotatable driving element mounted in the support, the secondary support carried by the former support, a pair of driven elements carried by the secondary support and opposed to the face of the driving element on opposite sides of the axis of the driving element, the driving element having a cam and the driven elements having followers with which the cam ultimately engages, the orbit of the cam lapping the orbits of said followers on opposite sides of the axis of the driving element and means for transferring and reversing the movement of one driven element to the other when the latter is out of engagement with the cam, substantially as and for the purpose set forth.

7. The combination of a support, a driving element rotatably mounted in the support and having an eccentric pin, a sub-support carried by the former support, a pair of rocking driven elements carried by the sub-support on opposite sides of the axis of the driving element and having radial arms, the end portions of which move in orbits lapping opposite portions of the orbit of the said pin, means for transferring and reversing the movement of one driven element to the other and a shaft connected to one driven element in axial alinement therewith, substantially as and for the purpose described.

In testimony whereof, I have hereunto signed my name, at Syracuse, in the county of Onondaga, and State of New York, this 18th day of April, 1922.

SERGIUS VERNET.